United States Patent [19]
Kim et al.

[11] Patent Number: 6,161,175
[45] Date of Patent: Dec. 12, 2000

[54] COMPUTER SYSTEM USING SOFTWARE TO ESTABLISH SET-UP VALUES OF A CENTRAL PROCESSING UNIT AND A CONTROL METHOD THEREOF

[75] Inventors: Sung-Soo Kim, Kunpo; Cheol-Seung Choi, Ansan, both of Rep. of Korea

[73] Assignee: SamSung Electronics Co., Ltd., Suwon, Rep. of Korea

[21] Appl. No.: 09/060,994

[22] Filed: Apr. 16, 1998

[30] Foreign Application Priority Data

Apr. 16, 1997 [KR] Rep. of Korea ............... 97-14013
Feb. 19, 1998 [KR] Rep. of Korea ............... 98-5126

[51] Int. Cl.[7] .................................................. G06F 9/445
[52] U.S. Cl. ........................................................ 713/1
[58] Field of Search .......................... 713/1, 100, 501

[56] References Cited

U.S. PATENT DOCUMENTS 4,366,540 12/1982 Berglund et al. ............... 713/501
5,293,494 3/1994 Saito et al. .
5,297,286 3/1994 Uehara .
5,479,645 12/1995 Sakai et al. .
5,561,792 10/1996 Ganapathy .
5,696,952 12/1997 Pontarelli .

*Primary Examiner*—Thomas M. Heckler
*Attorney, Agent, or Firm*—Robert E. Bushnell, Esq.

[57] ABSTRACT

A computer system includes a central processing unit (CPU); a bus connected to the CPU for providing a transmission passage for signals; a command input unit connected to the bus for receiving input of selected commands from the user; a display unit connected to the bus for providing a visual display of numbers, letters, symbols, etc. on a screen of the computer system; a chip set displaying data of set-up values corresponding to the CPU by control of the same through the display unit, and outputting user-selected set-up values; and a set-up value storage unit for receiving the set-up values from the chip set and storing the same. The CPU operates in accordance with set-up values stored in the set-up value storage unit.

7 Claims, 13 Drawing Sheets

COMPUTER SYSTEM USING SOFTWARE TO ESTABLISH SET-UP VALUES OF A CENTRAL PROCESSING UNIT AND A CONTROL METHOD THEREOF

CLAIM FOR PRIORITY

This application makes reference to, incorporates the same herein, and claims all benefits accruing under 35 U.S.C. §119 from an application for COMPUTER SYSTEM FOR ESTABLISHING SET-UP VALUES USING A SOFTWARE PROGRAM AND A CONTROL METHOD THEREOF earlier filed in the Korean Industrial Property Office on the of Apr. 16, 1997, and the 19$^{th}$ of Feb. 1998, and there duly assigned Ser. Nos. 14013/1997 and 5126/1998, respectively, copies of which applications are annexed hereto.

BACKGROUND OF THE INVENTION

1. Technical Field

The present invention relates to a computer system using software to establish set-up values for a central processing unit (CPU), and more particularly, relates to a computer system and a control method using software program to enable easy establishment of set-up values for a central processing unit (CPU).

2. Related Art

Main boards of computer systems are typically designed to allow compatibility with a variety of different types of central processing units (CPUs). When one CPU is first installed or exchanged for another, set-up values such as operating speed and specification suitable for the CPU must be established before the CPU can be configured.

Generally, a jumper setting unit is used to provide jumper values set by the user for the CPU, when a new CPU is mounted to the main board. The CPU then provides a visual display of the set-up values during an initial POST (power-on self test), and uses the established set-up values of the new CPU for operation. However, the process of establishing jumper values to match the CPU must be conducted during the assembly process of the computer system. Moreover, if the jumper values established do not match the CPU after the computer system has been fully assembled, the computer system must be disassembled to re-establish the set-up values. In either situation, the process is complicated, inconvenient, time-consuming, and particularly overwhelming if the user is not acquainted with computers. The problem is likewise experienced, when an existing CPU is exchanged for an upgraded CPU. If the set-up values are incorrectly established, the CPU will operate irregularly or become damaged.

SUMMARY OF THE INVENTION

Accordingly, it is therefore an object of the present invention to provide a computer system using software to establish set-up values for a central processing unit (CPU).

It is also an object to provide a computer system and a control method using software program to establish set-up values for a newly installed or exchanged central processing unit (CPU) on a main board to enhance its overall reliability.

These and other objects of the present invention can be achieved by a computer system which comprises a central processing unit (CPU) for controlling overall operation of the computer system; a bus connected to the CPU for providing a transmission passage of signals; a command input unit connected to the bus and which inputs selected commands; a display unit connected to the bus for providing a visual display of numbers, letters, symbols, etc.; a chip set for displaying data of set-up values corresponding to the CPU through the display unit, and outputting user-selected set-up values; and a set-up value storage unit for receiving the set-up values from the chip set and storing the same so that the CPU operates in accordance with the set-up values stored in the set-up value storage unit.

The set-up value storage unit comprises four delay flip-flops, each of the D flip-flops having a data terminal to which signals from the chip set are sent, a clock terminal grounded through a first resistor and to which a write signal from the chip set is sent, a voltage supply terminal connected to battery voltage, a clear terminal connected to the battery voltage via a second resistor and grounded through a capacitor, and an output terminal, each of the output terminals of the D flip-flops outputting the specific set-up values to the set-up value transmitting unit. The set-up value storage unit maintains the storage of the set-up values regardless of an ON or OFF state of the computer system.

According to another aspect of the present invention, a method of establishing set-up values for a computer system includes the steps of mounting a central processing unit (CPU), supplying power to the computer system, determining whether installed set-up values of the CPU are correct; changing set-up values when the installed set-up values are incorrect, and re-setting the computer s system such that the CPU operates in accordance with the changed set-up values.

According to yet another aspect of the present invention, a device for automatically varying a CPU operating speed of a computer system includes a central processing unit (CPU) for controlling overall operation of the computer system; a bus connected to the CPU for providing a transmission passage for signals; a command input unit connected to the bus for receiving input of selected commands from the user; a display unit connected to the bus for providing a visual display of numbers, letters, symbols, etc. on a screen of the computer system; and an environment storage unit connected to the bus for storing environment information installed in the computer system, such that data of operating speeds of the CPU is displayed through the display unit for selection by the user by control of the CPU, and if a specific CPU operating speed is selected by the user, the specific operating speed is stored in the environment storage unit then used by the CPU for operation.

According to still yet another aspect of the present invention, a method of automatically varying a CPU operating speed of a computer system includes the steps of displaying operating speed data of a central processing unit (CPU), determining if a specific CPU operating speed has been selected by the user, storing the specific CPU operating speed if the same has been selected by the user, and varying a CPU operating speed using the selected specific CPU operating speed. The CPU operating speed data includes external supply operating speed selection data supplied to the CPU, and internal operating multiple selection data determined internally by the CPU. The operating speed of the CPU is determined by multiplying the external supply operating speed with the internal operating multiple.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
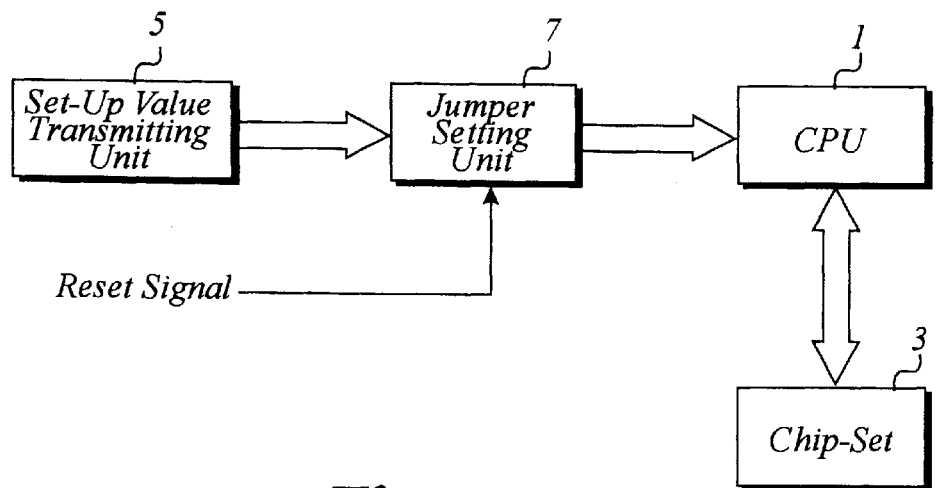
FIG. 1 is a block diagram of a main board of an exemplary computer system.

Referring now to the drawings and particularly to FIG. 1, which illustrates a main board of an exemplary computer system. The main board includes a central processing unit 1 for controlling overall operation of the computer system, a chip set 3 connected to the CPU 1, a jumper setting unit in which jumper values suitable for the CPU 1 can be set by the user, and a set-up value transmitting unit 7 for transmitting the jumper values established by the jumper setting unit 5 to the CPU 1 when a reset signal is not activated.

Figure 2:
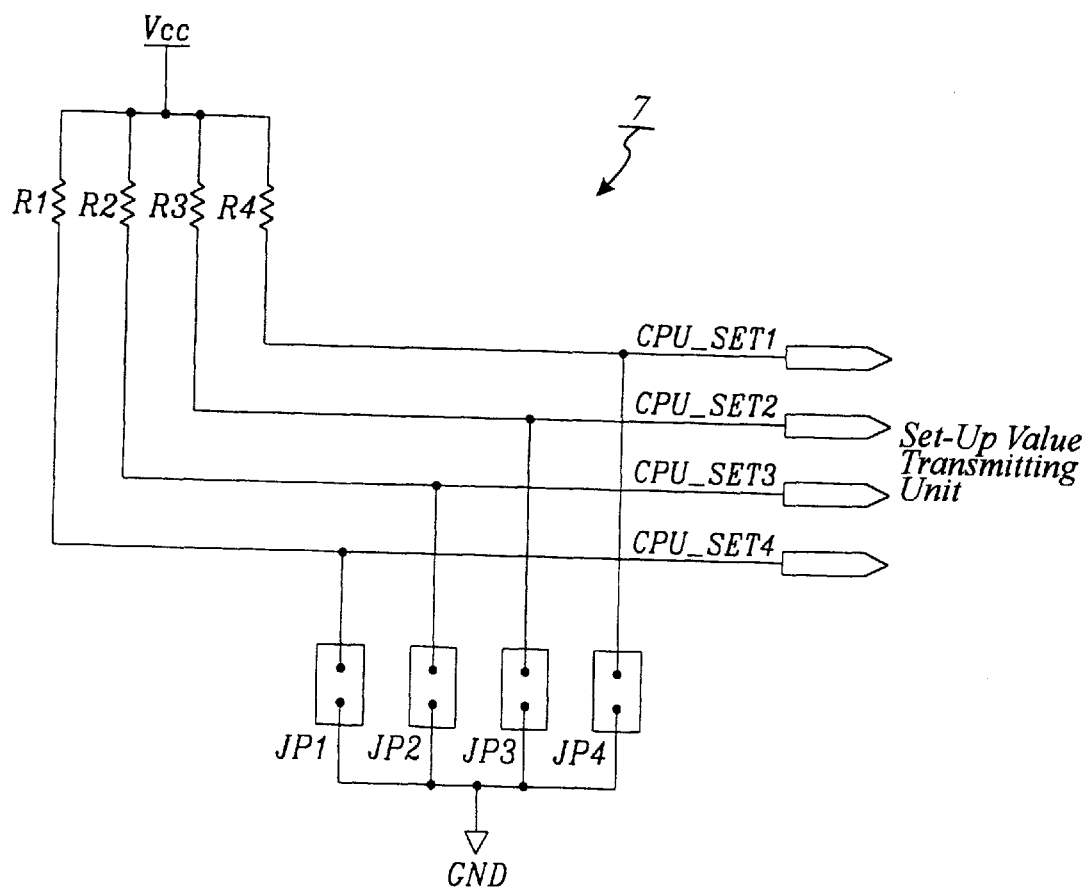
FIG. 2 is a circuit diagram of a jumper setting unit as shown in FIG. 1.

FIG. 2 illustrates a circuit diagram of the jumper setting unit 5 of the main board as shown in FIG. 1. The jumper setting unit 5 comprises first, second, third, and fourth jumpers JP1, JP2, JP3, and JP4 connected to a power terminal Vcc via respective first, second, third and fourth resistors R1, R2, R3, and R4 for providing different CPU_SET signals to the set-up value transmitting unit 5. Each jumper JP1, JP2, JP3, and JP4 includes a first terminal connected to ground and a second terminal connected to a power terminal Vcc via respective first, second, third and fourth resistors R1, R2, R3, and R4. The first resistor R1 is provided between the second terminal of the first jumper JP1 and the Vcc source. The second resistor R2 is provided between the second terminal of the second jumper JP2 and the Vcc source. The third resistor R3 is provided between the second terminal of the third jumper JP3 and the Vcc source. Likewise, the fourth resistor R4 is provided between the second terminal of the fourth jumper JP4 and the Vcc source.

The second terminal of the first jumper JP1 outputs set-up values to the set-up value transmitting unit 5 as a CPU_SET4 signal, the second terminal of the second jumper JP2 as a CPU_SET3 signal, the second terminal of the third jumper JP3 as a CPU_SET2 signal, and the second terminal of the fourth jumper JP4 as a CPU_SET1 signal.

When the user shorts the first jumper JP1, the CPU_SET4 signal is output to the set-up value transmitting unit 5 as a low signal, while if the first jumper JP1 is open by the user, the CPU_SET4 signal is output to the set-up value transmitting unit 5 as a high signal. The shorting and opening of the second, third, and fourth jumpers JP2, JP3, and JP4 also act to output their corresponding CPU_SET signals as low and high signals, respectively.

Figure 3:
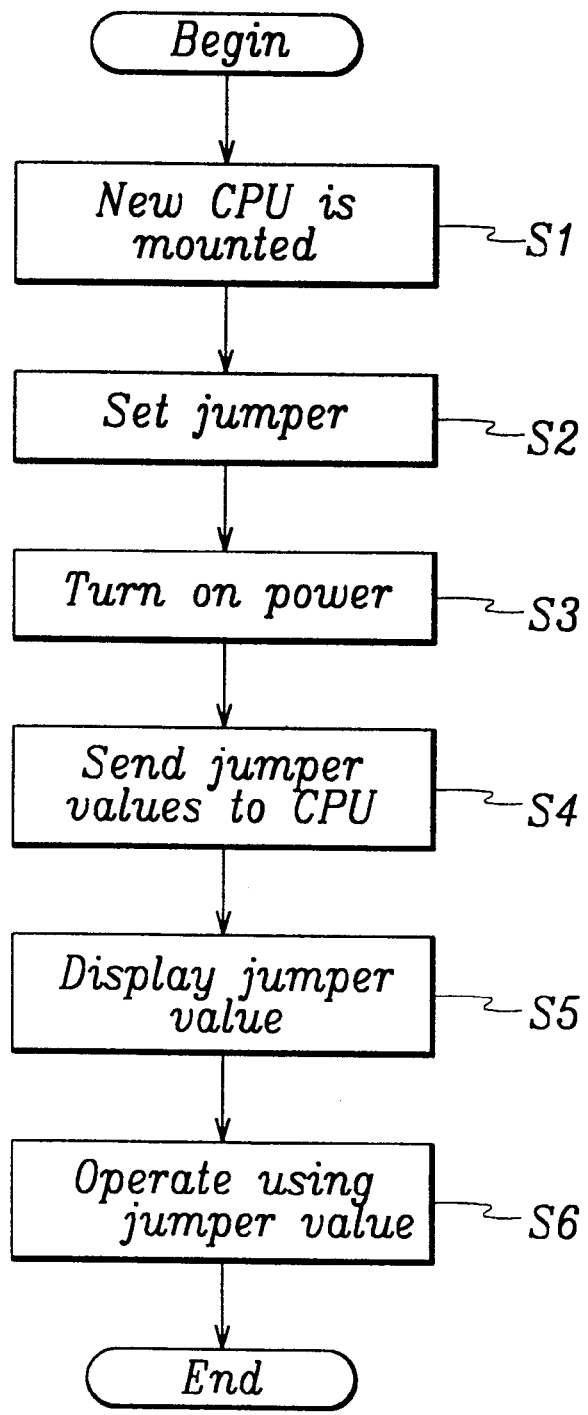
FIG. 3 is a flow chart of a CPU exchange method for the exemplary computer system.

FIG. 3 is a flow chart of a CPU exchange method for the exemplary computer system. First, the CPU is removed or exchanged and a new CPU is mounted on the main board at step S1. During this time, the computer system is placed in an OFF state and disconnected from an external power source, and an outside case of the computer system is removed. Then, the jumper values CPU_SET4, CPU_SET3, CPU_SET2, and CPU_SET1 that match the newly-mounted CPU 1 are established through each jumper JP1, JP2, JP3, and JP4, respectively, of the jumper setting unit 5 at step S2. Next, the computer system is re-connected to an external power source and turned ON at step S3.

When power is applied to the computer system and the computer system is turned ON, the set-up value transmitting unit 5 receives an input of the jumper values CPU_SET4, CPU_SET3, CPU_SET2, and CPU_SET1 established in step S2 and transmits the same to the CPU 1 at step S4. Subsequently, the CPU 1 executes an operation to display the set-up values (established by the jumper values CPU_SET4, CPU_SET3, CPU_SET2, and CPU_SET1) on an initial POST (power ON self test) screen at step S5, then operates using the established set-up values at step S6 after terminating the set-up value operation for an exchanged CPU.

However, as we have described, the process of establishing jumper values of a new CPU in the computer system has many drawbacks. First, the jumper values established by the user must match the CPU, and must be conducted during the assembly process of the computer system. Moreover, if the jumper values established do not match the CPU after the computer system has been fully assembled, the computer system must be disassembled to re-establish the set-up values. In either situation, the process is complicated, inconvenient, time-consuming, and particularly overwhelming if the user is not acquainted with computers. The problem is likewise experienced when an existing CPU is exchanged for an upgraded CPU. Contemporary CPUs, including the widely-used Pentium CPU, are made in a variety of internal operating speed types of 1.5, 2, 2.5, and 3 times an external supply speed. For example, P54C Pentium CPU made by Intel is designed to use three different types of external supply speed frequencies of 50 MHz, 60 MHz, and 66 MHz, and has its internal operating speed of 1.5, 2, 2.5, and 3 times the speed of the external supply speed frequencies. If the set-up values are incorrectly established, the CPU will operate irregularly or become damaged.

Figure 4:
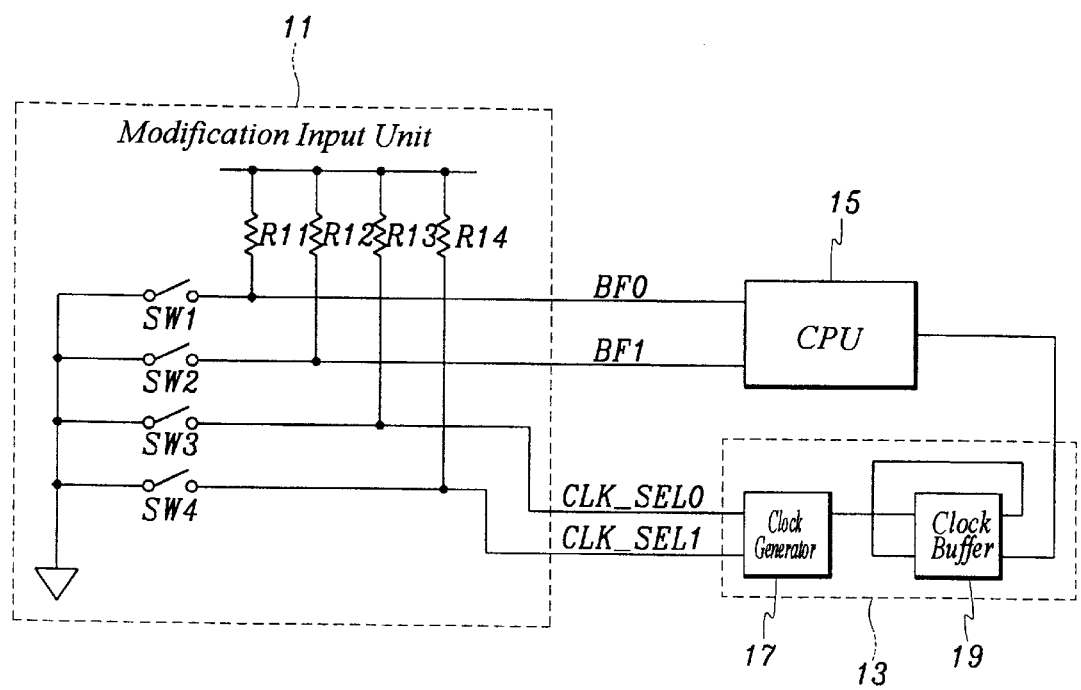
FIG. 4 is a circuit diagram of an exemplary device for varying operating speeds for a CPU.

FIG. 4 illustrates an exemplary device for varying operating speeds to correspond to different CPUs mounted on a computer system. As shown in FIG. 4, the device comprises a modification input unit 11 for receiving input from the user to vary the external supply speed and the internal operating speed multiple, a clock supply unit 13 for outputting a clock operating at an external supply speed as input by the user from the modification input unit 11, and a central processing unit (CPU) 15 for receiving input of both the internal operating multiple by the user from the modification input unit 11 and the clock from the clock supply unit 13 to operate the computer system in accordance with the changed input operating speed.

The modification input unit 11 includes a first, second, third, and fourth switch SW1, SW2, SW3, and SW4 each having first and second terminals, the first terminal of each switch SW1, SW2, SW3, and SW4 being grounded; a first resistor R11 having first and second terminals, the first terminal being connected to a Vcc source and the second terminal being connected to the second terminal of the first switch SW1; a second resistor R12 having first and second terminals, the first terminal being connected to the Vcc source and the second terminal being connected to the second terminal of the second switch SW2; a third resistor R13 having first and second terminals, the first terminal being connected to the Vcc source and the second terminal being connected to the second terminal of the third switch SW3; and a fourth resistor R14 having first and second terminals, the first terminal being connected to the Vcc source and the second terminal being connected to the second terminal of the fourth switch SW4. The second terminal of the first switch SW1 is also connected to a first internal operating multiple selection terminal BF0 of the CPU 15, and the second terminal of the second switch SW2 is also connected to a second internal operating multiple selection terminal BF1 of the CPU 15.

The clock supply unit 13 includes a clock generator 17, having a first external operating speed selection terminal CLK_SEL0 connected to the second terminal of the third switch SW3 of the modification input unit 11 and a second external operating speed selection terminal CLK_SEL1 connected to the second terminal of the fourth switch SW4 of the modification input unit 11, generates a clock operating at an external operating speed corresponding to the input of the user through the third and fourth switches SW3 and SW4; and a clock buffer 19 receiving the clock output from the clock generator 17 and outputting the same to where needed including the CPU 15.

The operation of the device for varying operating speed to be suitable for the CPU will be described with reference to FIG. 4 as follows. First, the user checks the correct operating speed of the CPU 15 mounted to the main board. Next, in order to set the correct operating speed, the user determines the needed external supply operating speed and the internal operating multiple, then operates each switch SW1, SW2, SW3, and SW4 of the modification input unit 11. Namely, the external supply operating speed is changed by operating the third and fourth switches SW3 and SW4, and the internal operating multiple is varied by operating the first and second switches SW1 and SW2.

Figure 5:
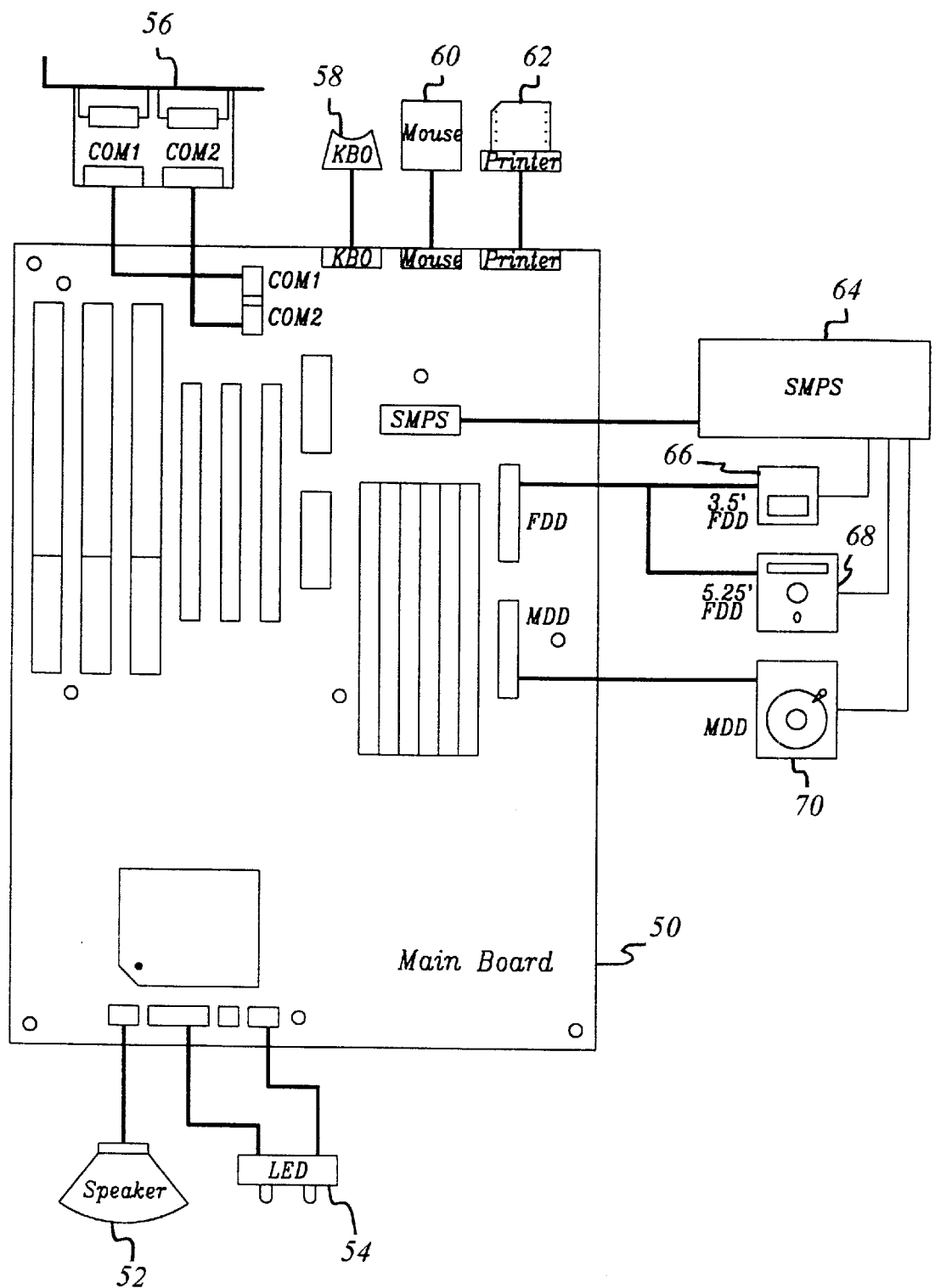
FIG. 5 is a schematic view of a main board and peripheral devices of the exemplary computer system.
Figure 6:
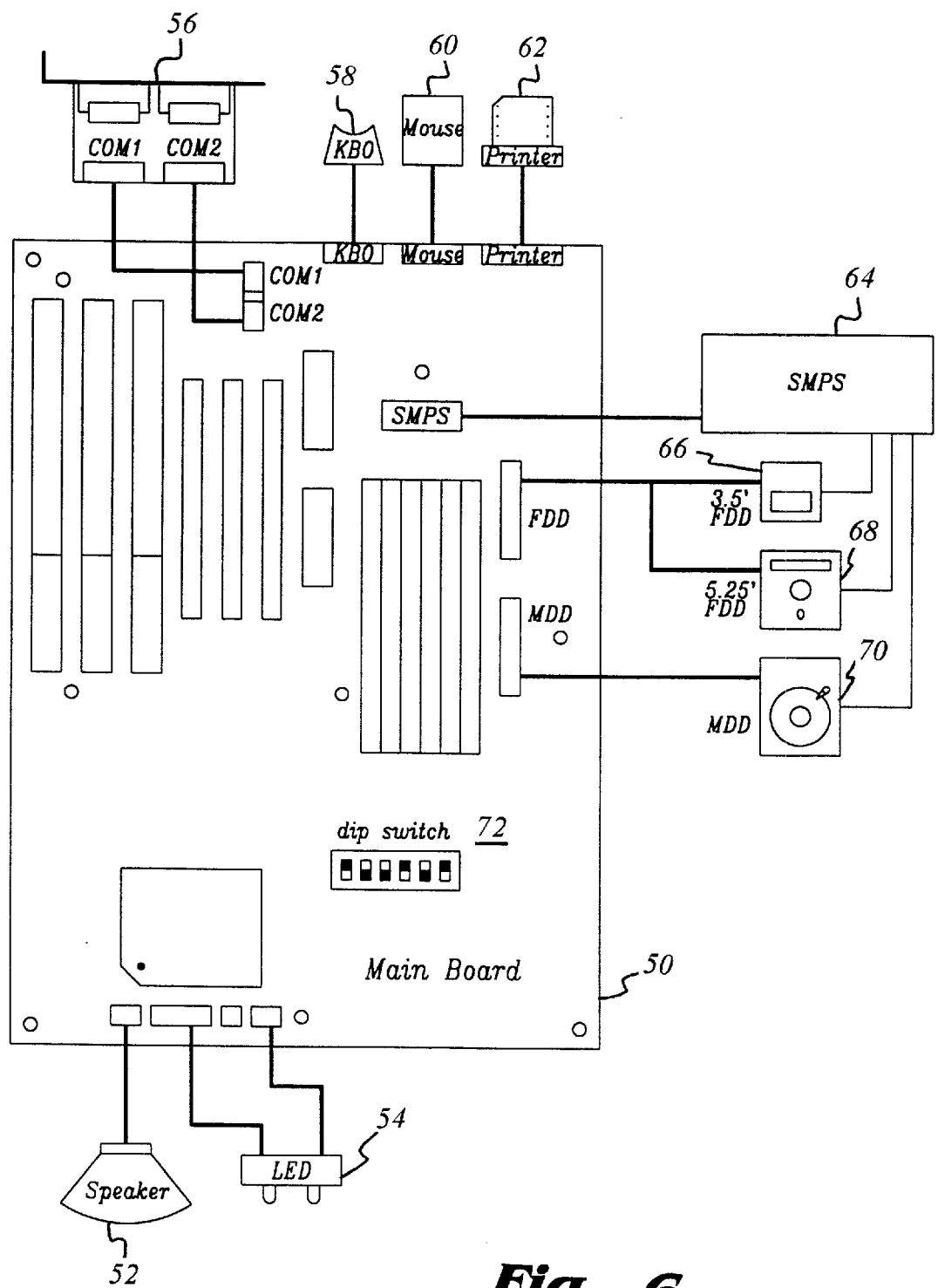
FIG. 6 is a schematic view of the main board having a DIP (dual in-line package) switch set mounted thereon.

Most personal computer manufacturers design the main boards of their computers so that they are compatible with a variety of Pentium CPUs. When changing CPUs, either DIP (dual in-line package) switches or jumper switches are manipulated to set operating speeds suitable for the CPU. A schematic view of a main board of the exemplary computer system and connection of the main board to peripherals is shown in FIG. 5. The main board 50 typically includes a variety of connectors and expansion slots for supporting a speaker 52, a LED unit 54, a communication unit 56, a KBO 58, an input device such as a mouse 60, an output device such as a printer 62, a SMPS unit 64, floppy disk drives (FDD) 68, 68 and a hard disk drive (HDD) 70. FIG. 6 is a schematic view of the main board with a DIP switch set 72 mounted thereon. The DIP switch set 72 includes the first, second, third, and fourth switches SW1, SW2, SW3, and SW4.

Referring back to FIG. 1, the clock generated is output to the CPU 15 through the clock buffer 19. The CPU 15 receives an internal operating multiple signal, generated by the operation of the first and second switches SW1 and SW2, via the first and second internal operating multiple selection terminals BF0 and BF1, and the clock output from the clock buffer 19, thereby operating to the changed internal operating speed. However, the contemporary process of varying operating speeds, checking the correct operating speed for the CPU and setting the switches to determine the external supply operating speed and the internal operating multiple to change the operating speed to correspond to the correct operating speed is complicated, inconvenient and time-consuming. Further, the process is difficult for those not well acquainted with computers. Finally, if the switches are incorrectly set, the CPU will operate incorrectly and can become damaged.

Figure 7:
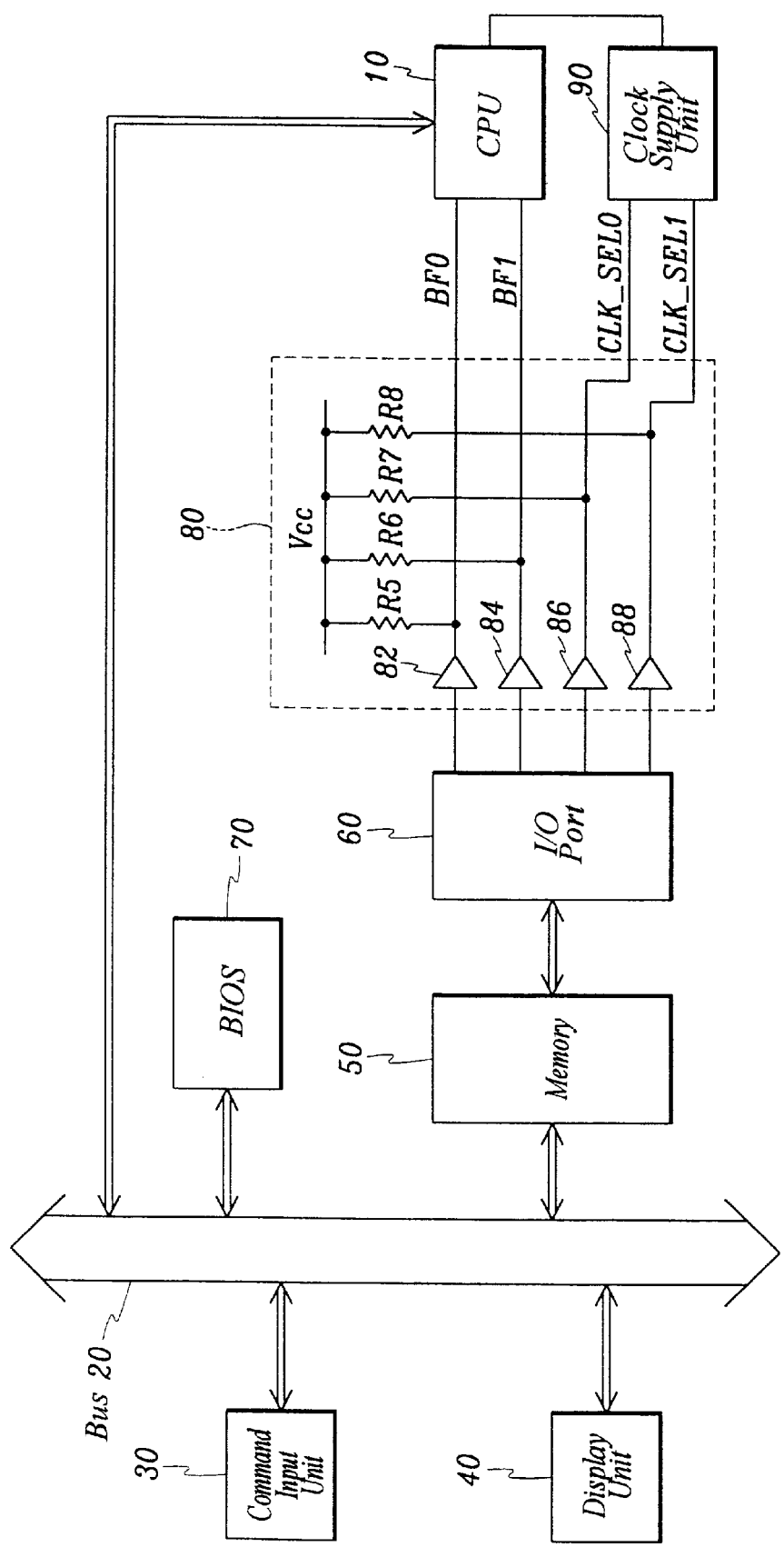
FIG. 7 is a block diagram of a computer system according to a first preferred embodiment of the present invention.

Turning now to FIG. 7, which illustrates a computer system constructed according to a first preferred embodiment of the present invention. The computer system comprises a central processing unit (CPU) 10, a bus 20, a command input unit 30, a display unit 40, a battery-backed memory 50, an input/output port 60, a basis input and output system (BIOS) 70, a signal transmitting unit 80, and a clock supply unit 90. The CPU 10 is used to control overall operation of the computer system. The bus 20 provides transmission passage for signals from the CPU 10, the command input unit 30, the display unit 40, the memory 50, and the BIOS 70. The command input unit 30 is connected to the bus 20 and receives input of selected commands from the user. The display unit 40 is connected to the bus 20 and provides a visual display of numbers, letters, symbols, etc. The battery-backed memory 50 is connected to the bus 20 and stores environments for the computer system. The input/output (I/O) port 60 outputs data stored in the battery-backed memory 50. The BIOS 70 is controlled by the CPU 10 and provides data of operating speeds on the computer screen through the display unit 40. If a particular operating speed is selected through the command input unit 30, the BIOS 70 stores a value for selecting an external supply operating speed and a value for selecting an internal operating multiple in the battery-backed memory 50. The signal transmitting unit 80 establishes initial values of external supply operating speed selection signals CLK_SEL0 and CLK_SEL1 and internal operating multiple selection signals BF0 and BF1 and outputs the same to establish an initial operating speed of the CPU 10 when the computer system is in an initial power ON state, and, when the computer system is in a normal operating mode, outputting the external supply operating speed selection signals CLK_SEL0 and CLK_SEL1 and the internal operating multiple selection signals BF0 and BF1 received from the input/output port 60. The clock supply unit 90 receives input of the external supply operating speed selection signals CLK_SEL0 and CLK_SEL1 from the signal transmitting unit 80, and generates a clock operating at the external supply operating speed.

The CPU 10 further receives the internal operating multiple selection signals BF0 and BF1, output from the signal transmitting unit 80, and the clock generated in the clock supply unit 90, and operates to a particular operating speed selected through the command input unit 20.

The signal transmitting unit 80 includes first and second open collector buffers 82 and 84 for outputting a signal of the internal operating multiple, output from the input/output port 60, to the CPU; third and fourth open collector buffers 86 and 88 for receiving a signal of the external supply operating speed output from the input/output port 60 and outputting the signal to the clock supply unit 90; and pull-up resistors R5, R6, R7, and R8, a terminal of each of which is connected respectively to the buffers 82, 84, 86, and 88, and another terminal of each of which is connected to a Vcc source, the pull-up resistors R5, R6, R7, and R8 establishing initial values of the internal operating multiple selection signals BF0 and BF1 and the external supply operating speed selection signals CLK_SEL0 and CLK_SEL1 when power is supplied to the computer system.

Figure 8:
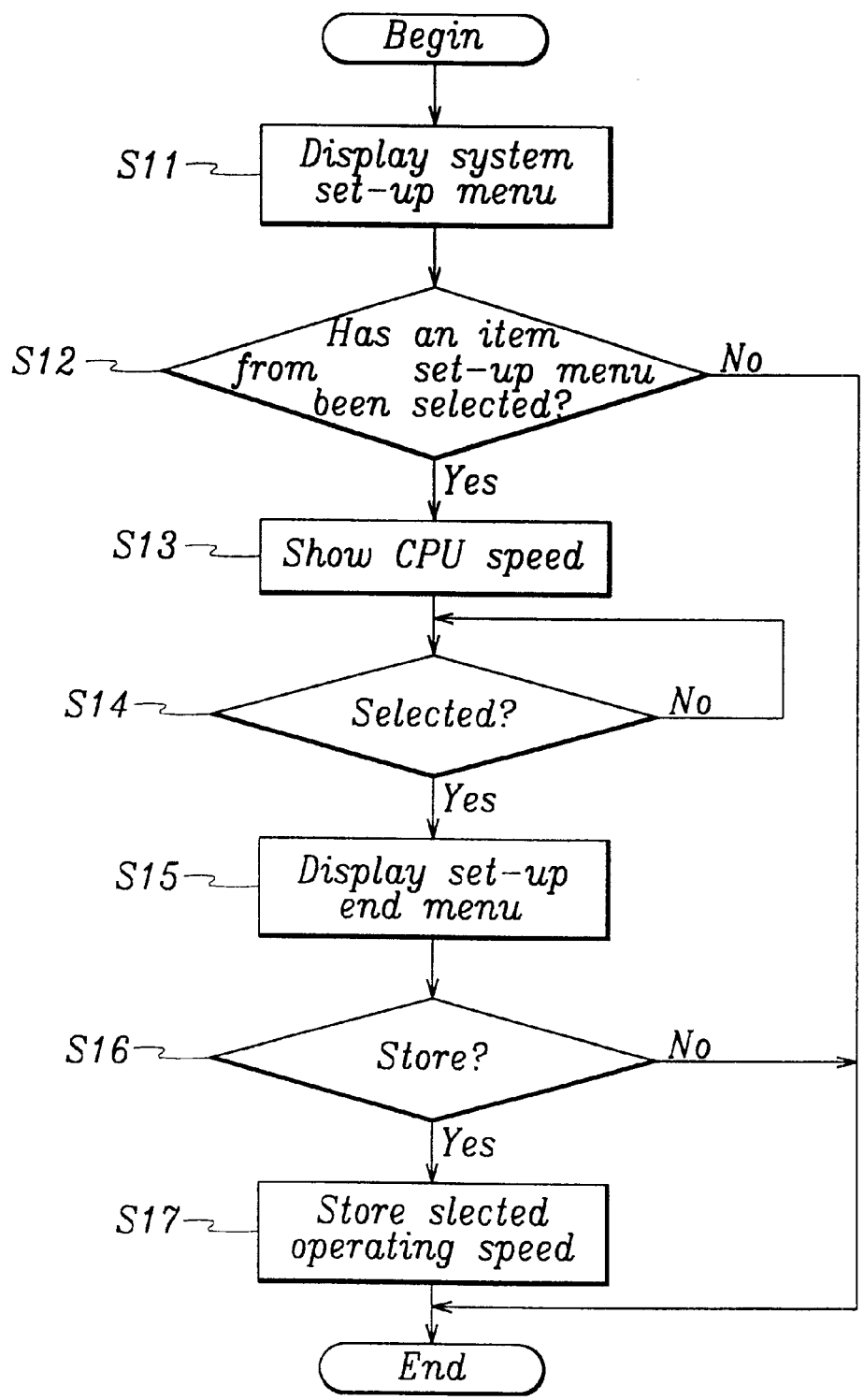
FIG. 8 is a flow chart of a control method for establishing set-up values using software of the computer system shown in FIG. 7.

FIG. 8 illustrates a control method for establishing set-up values using software of the computer system according to the first embodiment of the present invention.

First, in an initial state where the computer system is connected to an external power source and power is applied thereto, as there is no signal output through the input/output (I/O) port 60, the internal operating multiple selection signals BF0 and BF1, and the external supply operating speed selection signals CLK_SEL0 and CLK_SEL1, supplied to the CPU 10 and the clock-supply unit 90 by the pull-up resistors R5, R6, R7, and R8, are applied as high signals.

The clock supply unit 90 generates a clock, operating to the following speeds appearing in Table 1, according to the external supply operating speed selection signals CLK_SEL0 and CLK_SEL1 input from the signal transmitting unit 80.

TABLE 1

| CLK_SEL0 | CLK_SEL1 | Operating Frequency |
| --- | --- | --- |
| High | High | 50 MHz |
| High | Low | 60 MHz |
| Low | High | 66.6 MHz |

As shown in Table 1, in an initial power ON state of the computer system, the clock supply unit 90 receives the external supply operating speed selection signals CLK_SEL0 and CLK_SEL1 as high signals from the signal transmitting unit 80 such that a clock with a frequency of 50 MHz is generated and the same output to the CPU 10.

Further, the CPU 10 determines the following internal operating multiples shown in Table 2 according to the internal operating multiple selection signals BF0 and BF1 input from the signal transmitting unit 80.

TABLE 2

| BF0 | BF1 | Internal Operating Multiple |
| --- | --- | --- |
| High | High | 1.5 |
| Low | High | 2 |
| Low | Low | 2.5 |
| High | Low | 3 |

When the initial power is ON, the CPU 10 determines the internal operating speed at 1.5 times when receiving the internal operating multiple selection signals BF0 and BF1 as high signals from the signal transmitting unit 80. Therefore, in the initial power ON state of the computer system, the CPU 10 receives a clock of 50 MHz from the clock supply unit 90, and with the determination of the internal operating speed of 1.5 times, operates at a frequency of 75 MHz.

Figure 9:
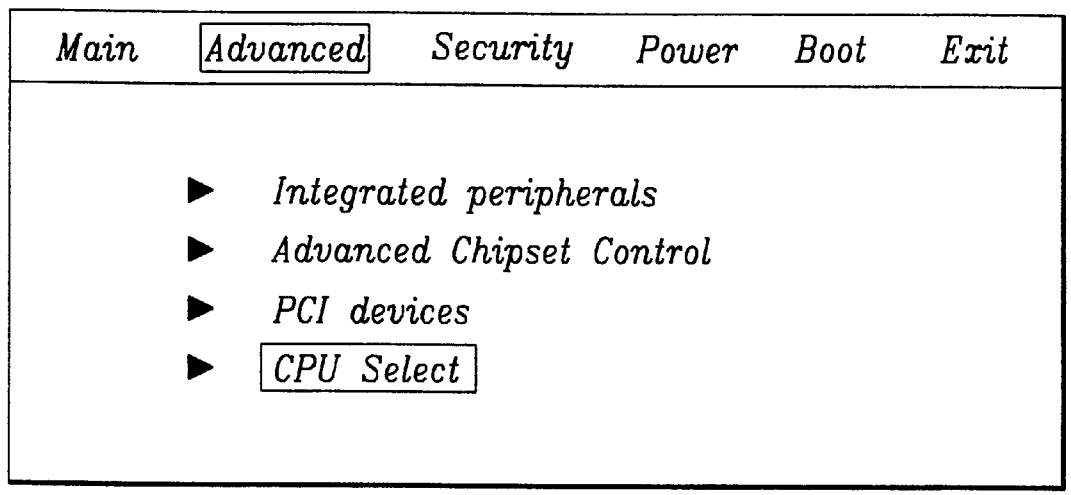
FIG. 9 illustrates an initial set-up menu for the computer system shown in FIG. 7.

In order to change the operating speed of the CPU 10 set at 75 MHz in an initial state, an automatic operating speed varying algorithm, installed in the BIOS 70, is used by the CPU 10. Namely, in step S11 of FIG. 8, the BIOS 70 performs control routine to provide a visual display of a system set-up menu for the establishment of an operating environment of the computer system as shown in FIG. 9 through the display unit 40 via the bus 20. Here, the user chooses a selection from the menu for changing the CPU 10 operating speed. That is, after selecting "Advanced", the user then chooses "CPU Select".

Figure 10:
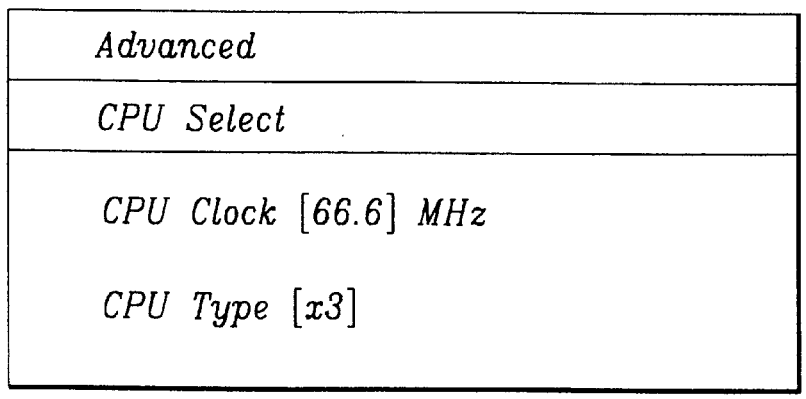
FIG. 10 illustrates a menu for selecting set-up values for a CPU of the computer system shown in FIG. 7.

Next, if an item from the set-up menu has been selected by the user to change the operating speed of the CPU 10 at step S12, the BIOS 70 performs control to provide a visual display of a menu through the display unit 40 as shown in FIG. 10 at step S13.

In the menu of FIG. 10, the user can select the external supply operating speed ("CPU Clock" in the drawing) and the operating multiple ("CPU Type" in the drawing). This selection is made through the command input unit 30 by the user. For example, if it is desired to change the operating speed of the CPU 10 to 200 MHz, the user selects 66.6 MHz for the external supply operating speed, and "×3" for the internal operating speed.

Figure 11:
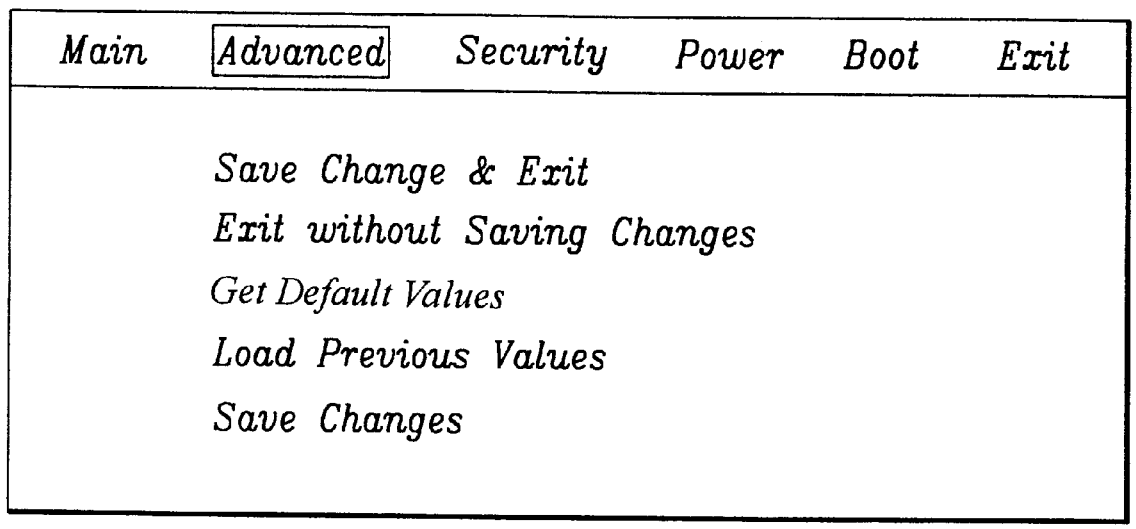
FIG. 11 illustrates a set-up end menu for the computer system shown in FIG. 7.

Subsequently, if it is determined that the external supply operating speed and the internal operating multiple has been selected at step S14, the BIOS 70 performs control to display a set-up end menu through the display unit 40 as shown in FIG. 11 at step S15. Here, the user can select either "Save Changes & Exit" or "Save Changes" to store the newly-established set-up values.

In step S16, if it is determined that a save selection has been made in the set-up end menu, the BIOS 70 stores the selected external supply operating speed and the internal operating multiple values in the battery-backed memory 50 at step S17.

Next, the BIOS 70 resets the computer system and initializes the same to the newly-stored operating environment established as in the above. That is, at the moment the system is reset, the value for selecting the external supply operating speed and that for the internal operating multiple, both stored in the battery-backed memory 50, are output to the signal transmitting unit 80 via the input/output port 60. Accordingly, the signal transmitting unit 80 outputs these input signals to the clock supply unit 90 and to the CPU 10 such that the particular operating speed can be determined by these input signals.

For example, if the external supply operating speed is selected at 66.6 MHz and the internal operating speed is selected at a multiple of 3, a value (i.e., as that showed in Table 1) is stored in the battery-backed memory 50 such that the clock supply unit 90 can generate a clock of 66.6 MHz, and a value (i.e., as that showed in Table 2) is stored in the battery-backed memory 50 such that the CPU 10 can determine the internal operating multiple as 3 times. These values stored in the battery-backed memory 50 are then output to the input/output port 60.

In the above example, the signals BF0, BF1, CLK_SEL0, and CLK_SEL1 stored in the battery-backed memory 50 and output to the input/output port 60 have high, low, low, high levels. This sequence of levels corresponds to input of the first, second, third, and fourth open collector buffers 82, 84, 86, and 88.

Next, the input/output port 60 outputs signals corresponding to the values input from the battery-backed memory 50 to the signal transmitting unit 80. That is, the input/output port 60 outputs a high signal to the first open collector buffer 82, a low signal to the second open collector buffer 84, a low signal to the third open collector buffer 86, and a high signal to the fourth open collector buffer 88.

The open collector buffers 82, 84, 86, and 88 operate identically to conventional switches. Namely, if a low signal is input from the input/output port 60, the buffers 82, 84, 86, and 88 are operated to ON states such that the output of the same are low, and, conversely, if a high signal is input from the input/output port 60, the buffers 82, 84, 86, and 88 are operated to OFF states such that the output of the same are high.

Therefore, if high and low signals are input respectively to the first and second open collector buffers 82 and 84, the internal operating multiple selection signals BF0 and BF1 are input to the CPU 10 as high and low signals, respectively. Further, if low and high signals are input respectively to the third and fourth open collector buffers 86 and 88, the external supply operating speed selection signals CLK_SEL0 and CLK_SEL1 are input to the CPU 10 as low and high signals, respectively.

After the clock supply unit 90 receives input of the external supply operating speed selection signals CLK_SEL0 and CLK_SEL1 from the signal transmitting unit 80 and generates a clock operating to frequencies as shown in Table 1, the clock is input to the CPU 10. In the above example, as the external supply operating speed selection signals CLK_SEL0 and CLK_SEL1 are input to the clock supply unit 90 as low and high signals, respectively, the clock supply unit 90 generates a clock operating at 66.6 MHz, as shown in Table 1, then outputs the same to the CPU 10.

The CPU 10 receives input of the internal operating multiple selection signals BF0 and BF1 from the signal transmitting unit 80 to determine corresponding operating multiples as shown in Table 2, formulates a final operating speed by multiplying the determined multiple to the clock speed input from the clock supply unit 90, then operates at the calculated speed. Therefore, in the above example, as the internal operating multiple selection signals BF0 and BF1 are respectively input to the CPU 10 as high and low signals as shown in Table 2, the CPU 10 determines the internal operating multiple as 3 times, then multiples the 66.6 MHz clock output from the clock supply unit 90 by 3 such that the CPU operates at a 200 MHz clock.

Figure 12:
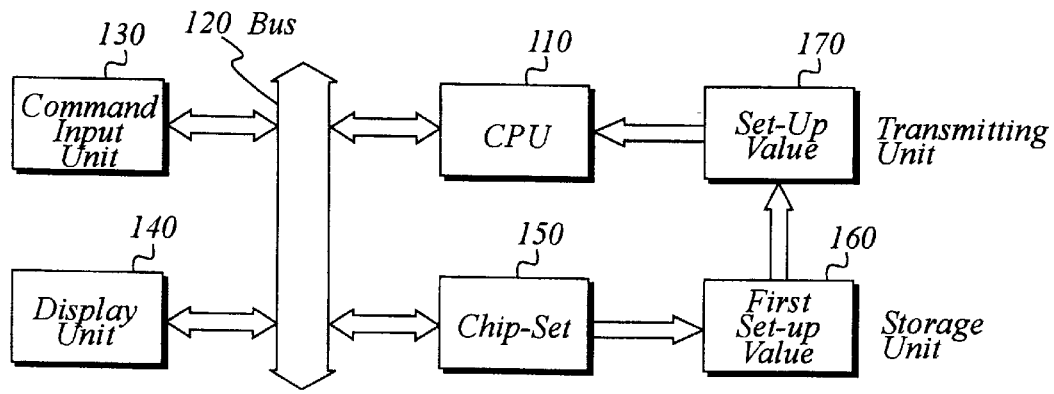
FIG. 12 is a block diagram of a computer system constructed according to a second preferred embodiment of the present invention.

FIG. 12 illustrates a computer system according to a second preferred embodiment of the present invention. As shown in FIG. 12, the computer system comprises a CPU 110 for controlling overall operation of the computer system; a bus 120 connected to the CPU 110 for providing a transmission passage of signals; a command input unit 130 connected to the bus 120 for receiving input of selected commands from the user; a display unit 140 connected to the bus 120 for providing a visual display of numbers, letters, symbols, etc.; a chip set 150 for displaying data of set-up values established by the CPU 110 through the display unit 140, and, when receiving specific set-up values from the command input unit 130, outputting signals GP01, GP02, GP03, GP04, and write signal for establishing specific set-up values; a first set-up value storage unit 160 for receiving input of the signals GP01, GP02, GP03, GP04, and write signal for establishing set-up values from the chip set 150 to store and output the same as specific set-up values CPU_SET1, CPU_SET2, CPU_SET3, and CPU_SET4; and a set-up value transmitting unit 170 for transmitting the specific set-up values CPU_SET1, CPU_SET2, CPU_SET3, and CPU_SET4 output from the first set-up value storage unit 160 to the CPU 110.

Figure 13:
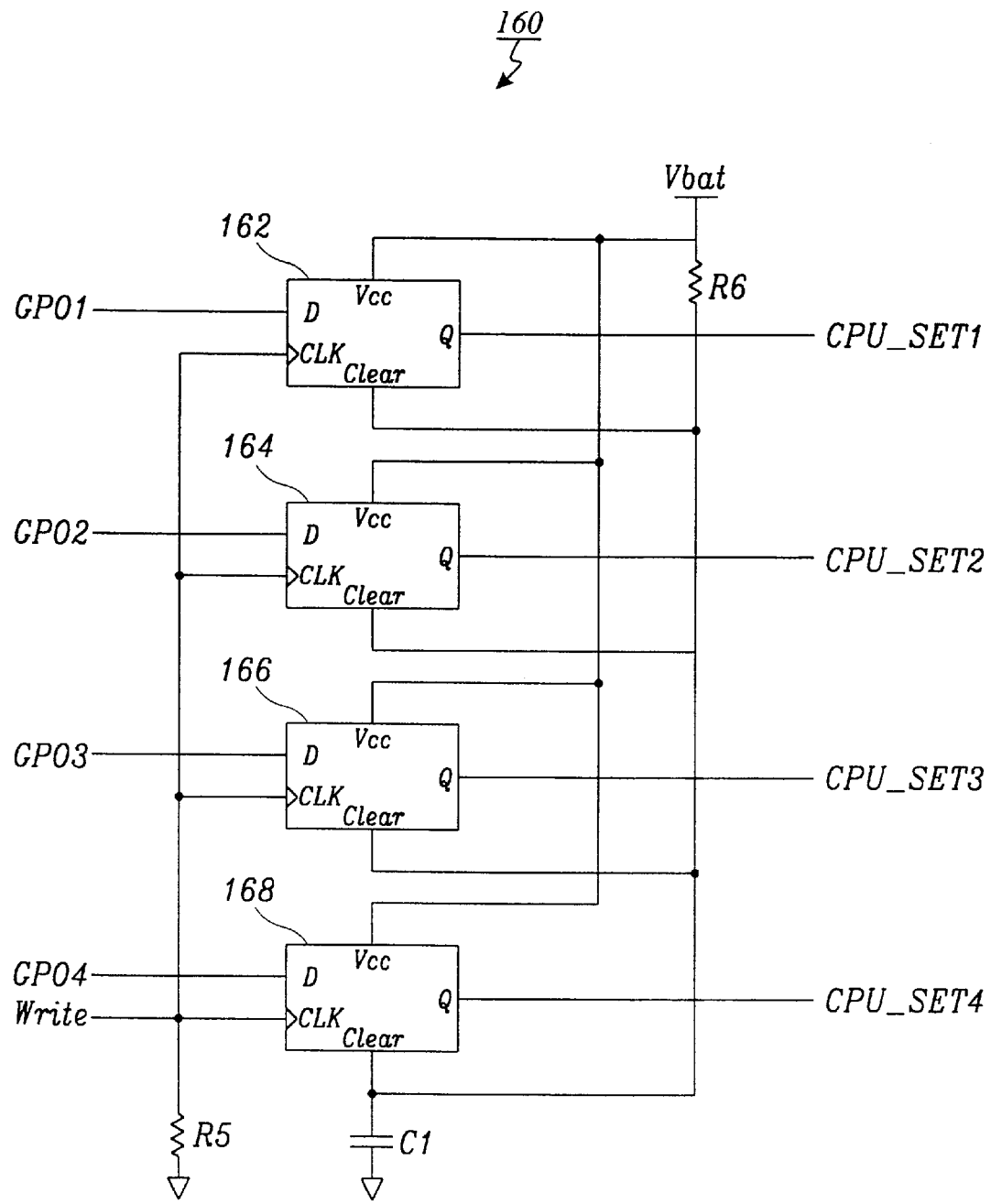
FIG. 13 is a circuit diagram of a first set-up value storage unit shown in FIG. 12.

FIG. 13 is a circuit diagram of the first set-up value storage unit 160 of the computer system as shown in FIG. 12. The first set-up value storage unit 160 includes four delay flip-flop (D flip-flop) 162, 164, 166, and 168. Each D flip-flop 162, 164, 166, and 168 has a data terminal D to which the signals GP01, GP02, GP03, and GP04 from the chip set 150 are respectively sent; a clock terminal CLK grounded through a fifth resistor R5 and to which the write signal from the chip set 150 is sent; a voltage supply terminal Vcc connected to battery voltage Vbat; a clear terminal (Clear) connected to the Vbat via a sixth resistor R6 and grounded through a first capacitor C1; and an output terminal Q, each of the output terminals Q of the D flip-flops 162, 164, 166, and 168 outputting the specific set-up values CPU_SET1, CPU_SET2, CPU_SET3, and CPU_SET4, respectively, to the set-up value transmitting unit 170.

Figure 14:
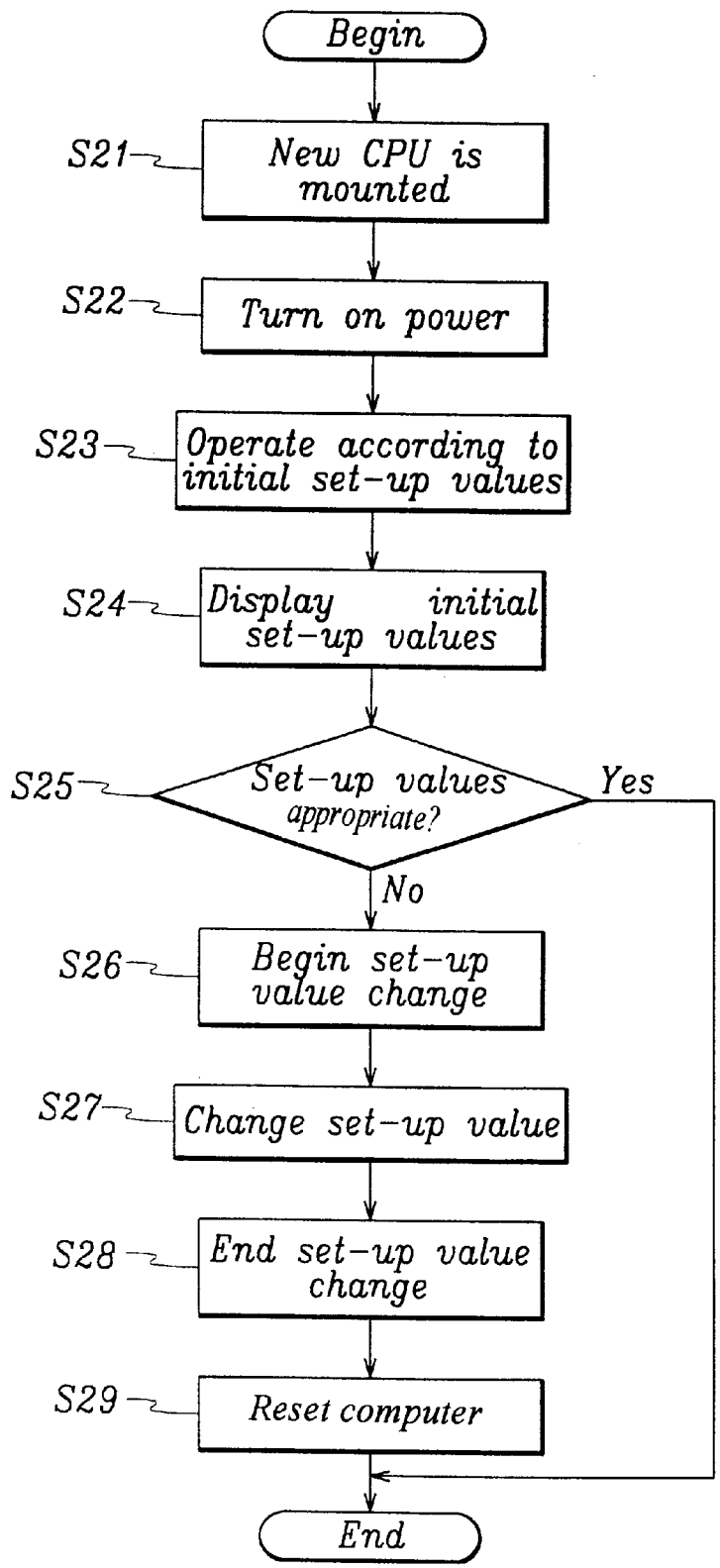
FIG. 14 is a flow chart of a control method for establishing set-up values using software of the computer system shown in FIG. 12.

FIG. 14 illustrates a control method for establishing set-up values using software of the computer system according to the second embodiment of the present invention.

First, in the computer system of the second preferred embodiment, a battery is used to maintain values of main elements of the system regardless of whether the same is in an ON or OFF state. When the battery is mounted to the computer system, i.e. when battery voltage Vbat is supplied to the system, the D flip-flops 162, 164, 166, and 168 of the first set-up value storage unit 160 are cleared, and the set-up values CPU_SET1, CPU_SET2, CPU_SET3, and CPU_SET4 are all output as low signals. The set-up values CPU_SET1, CPU_SET2, CPU_SET3, and CPU_SET4 are communicated to the CPU 110 via the set-up value transmitting unit 170.

As a result, as shown in FIG. 14, if the CPU 110 is mounted to the main board at step S21 and the computer system is placed in an ON state at step S22, the set-up values are supplied to the CPU 110 as low signals, and the CPU 110 operates according to these set-up values at step S23. However, if a new CPU 110 is mounted to the main board for upgrading at step S21 and the computer system placed in an ON state in step S22, the set-up values CPU_SET1, CPU_SET2, CPU_SET3, and CPU_SET4 output from the first set-up value storage unit 160 are those corresponding to the previously-installed central processing unit (CPU). Accordingly, the newly-installed CPU 110 initially operates in accordance with these set-up values.

As in the above, if power is supplied to the computer system in step S22, the CPU 110 operates in accordance with initial set-up values at step S23, and performs control to display the initial set-up values through the display unit 140 during the POST at step S24.

Next, the user determines whether the displayed set-up values are correct for the exchanged CPU 110 at step S25. If the displayed set-up values are suitable for the exchanged CPU 110, they are left as is, but if the set-up values are not correct for the exchanged CPU 110 a computer system set-up program is started using the command input unit 130 at step S26. Using the computer system set-up program, the user establishes set-up values suitable for the exchanged CPU 110 using the command input unit 130 at step S27.

Subsequently, the user ends the computer system set-up program at step S28 such that the signals GP01, GP02, GP03, GP04, and write signal for establishing set-up values are output from the chip set 150. Here, the write signal, used to store the signals GP01, GP02, GP03, and GP04 in the first set-up value storage unit 160, operates on the clock terminals CLK of each D flip-flop 162, 164, 166, and 168 of the first set-up value storage unit 160. When the write signal changes from a low level to a high level, the signals GP01, GP02, GP03, and GP04 input to the data terminals D of the D flip-flops 162, 164, 166, and 168 are stored in the same, and output to the set-up value transmitting unit 170 as set-up values CPU_SET1, CPU_SET2, CPU_SET3, and CPU_SET4 via their respective output terminals Q.

The set-up value transmitting unit 170 receives input of the set-up values CPU_SET1, CPU_SET2, CPU_SET3, and CPU_SET4, stored and output from the D flip-flops 162, 164, 166, and 168 of the first set-up value storage unit 160, and outputs the same to the CPU 110. After the set-up values are established as described, the computer system is reset at step S29 such that the CPU 110 operates to the newly-established set-up values. The set-up values are displayed on the screen during the POST such that the user can check to ensure that they are correct.

Figure 15:
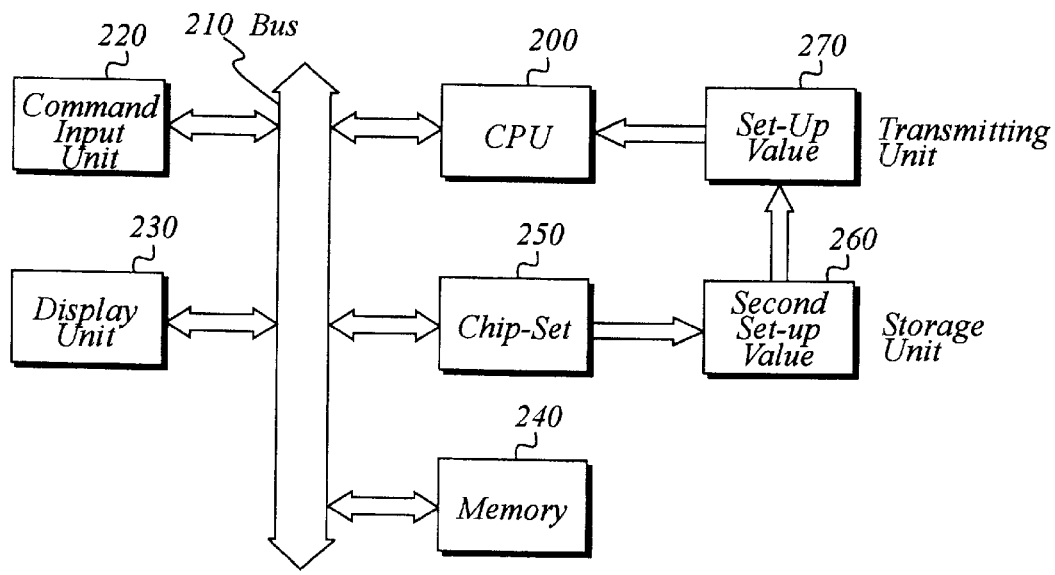
FIG. 15 is a block diagram of a computer system constructed according to a third preferred embodiment of the present invention.

FIG. 15 illustrates a computer system according to a third preferred embodiment of the present invention. As shown in FIG. 15, the computer system comprises a CPU 200 for controlling overall operation of the computer system; a bus 210 connected to the CPU 200 for providing a transmission passage of signals; a command input unit 220 connected to the bus 210 for receiving input of selected commands from the user; a display unit 230 connected to the bus 210 for providing a visual display of numbers, letters, symbols, etc.; a battery-backed memory 240 connected to the bus 210 for storing environments installed in the computer system; a chip set 250 for displaying data of set-up values established by the CPU 200 through the display unit 230, and, when receiving specific set-up values from the command input unit 220, storing the specific set-up values in the battery-backed memory 240 and outputting signals GP01, GP02, GP03, GP04, and write signal for establishing specific set-up values; a second set-up value storage unit 260 for receiving input of the signals GP01, GP02, GP03, GP04, and write signal to establish set-up values from the chip set 250 to store and output the same as specific set-up values CPU_SET1, CPU_SET2, CPU_SET3, and CPU_SET4; and a set-up value transmitting unit 270 for transmitting the specific set-up values CPU_SET1, CPU_SET2, CPU_SET3, and CPU_SET4 output from the second set-up value storage unit 260 to the CPU 200. The battery-backed memory 240 is used to store values even if power to the computer system is cut off.

Figure 16:
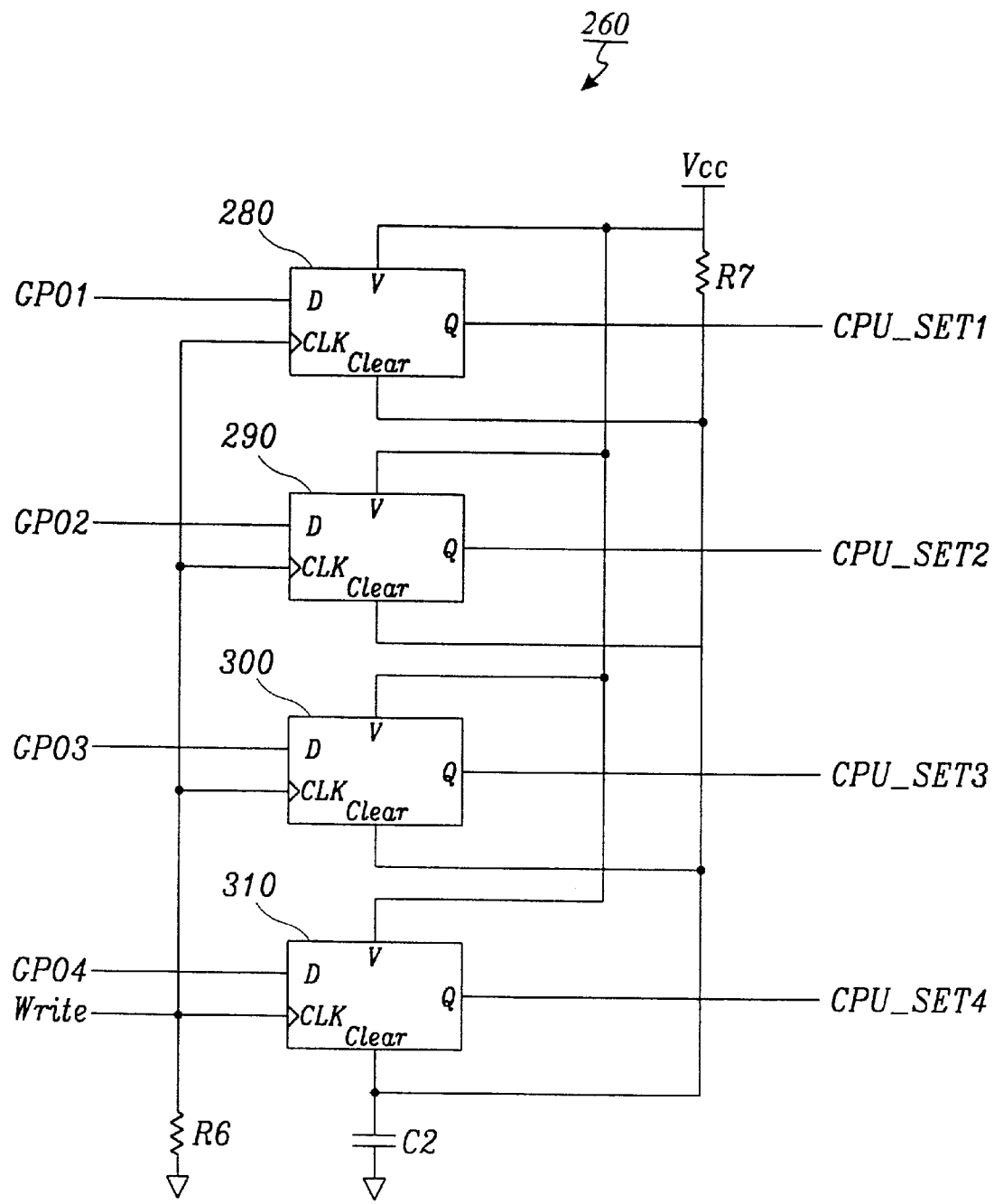
FIG. 16 is a circuit diagram of a second set-up value storage unit shown in FIG. 15.

FIG. 16 is a circuit diagram of the second set-up value storage unit 260 of the computer system as shown in FIG. 15. The second set-up value storage unit 260 includes four delay flip-flop (D flip-flop) circuits 280, 290, 300, and 310. Each D flip-flop 280, 290, 300, and 310 has a data terminal D to which the signals GP01, GP02, GP03, and GP04 from the chip set 250 are respectively sent; a clock terminal CLK grounded through a seventh resistor R7 and to which the Write signal from the chip set 250 is sent; a voltage supply terminal connected to power voltage Vcc of the computer system; a clear terminal (Clear) connected to the power voltage Vcc via an eighth resistor R8 and grounded through a second capacitor C2; and an output terminal Q, each of the output terminals Q of the D flip-flops 280, 290, 300, and 310 outputting the specific set-up values CPU-SET1, CPU_SET2, CPU_SET3, and CPU_SET4, respectively, to the set-up value transmitting unit 270.

A control method for establishing set-up values using software of the above-described computer system according to the third embodiment of the present invention will be described hereinafter with reference to FIG. 14 (used above for describing the method of the second embodiment).

First, in the computer system of the third preferred embodiment, the battery-backed memory 240 is used to maintain values of main elements of the system regardless of whether the same is in an ON or OFF state. Values for establishing set-up values to which the CPU 200 operates are also installed in the battery-backed memory 240.

When the battery-backed memory 240 is mounted to the computer system, the set-up values CPU-SET1, CPU_SET2, CPU_SET3, and CPU-SET4 output from the D flip-flops 280, 290, 300, and 310 of the second set-up value storage unit 260 are output as low signals, then output transmitted to the CPU 200 through the set-up value transmitting unit 270.

As a result, as shown in FIG. 14, if the CPU 200 is mounted to the main board at step S21 and the computer system is placed in an ON state at step S22, the set-up values CPU_SET1, CPU_SET2, CPU_SET3, and CPU_SET4 are supplied to the CPU 200 as low signals, and the CPU 200 operates according to these set-up values CPU_SET1, CPU_SET2, CPU_SET3, and CPU_SET4 at step S23. However, when mounting a new CPU 200 to the main board to upgrade the computer system at step S21 and the computer system placed in an ON state at step S22, the chip set 250 reads the values stored in the battery-backed memory 240 and outputs the signals GP01, GP02, GP03, GP04, and write signal for establishing the set-up values CPU_SET1, CPU_SET2, CPU_SET3, and CPU_SET4 to the second set-up value storage unit 260. The second set-up value storage unit 260 then outputs the set-up values CPU_SET1, CPU_SET2, CPU_SET3, and CPU_SET4 corresponding to the signals GP01, GP02, GP03, and GP04 received from the chip set 250 to the CPU 200. Here, the set-up values CPU_SET1, CPU_SET2, CPU_SET3, and CPU_SET4 output to the CPU 200 are those corresponding to the previously-installed central processing unit (CPU). Accordingly, the newly-installed CPU 200 initially operates in accordance with these set-up values.

As in the above, if power is supplied to the computer system in step S22, the CPU 200 operates according to initial set-up values in step S23, and performs control to display initial set-up values through the display unit 230 during the POST in step S24.

Next, the user determines whether the displayed set-up values are correct for the exchanged CPU 200 at step S25. If the displayed set-up values are suitable for the newly-installed CPU 200, they are left as is, but if the set-up values are not correct for the exchanged CPU 200 a computer system set-up program is started using the command input unit 220 at step S26. Using the computer system set-up program, the user establishes set-up values suitable for the exchanged CPU 200 using the command input unit 220 at step S27.

Subsequently, the user ends the computer system set-up program at step S28 such that the new set-up values are stored in the battery-backed memory 240. The chip set 250 then reads the set-up values stored in the battery-backed memory 240 and outputs the values as signals GP01, GP02, GP03, GP04, and write to the second set-up value storage unit 260.

The write signal, used to store the signals GP01, GP02, GP03, and GP04 in the second set-up value storage unit 260, operate on the clock terminals CLK of each D flip-flop 280, 290, 300, and 310 of the second set-up value storage unit 260. When the write signal changes from a low level to a high level, the signals GP01, GP02, GP03, and GP04 input to the data terminals D of the D flip-flops 280, 290, 300, and 310 are stored in the same, and output to the set-up value transmitting unit 270 as set-up values CPU-SET1, CPU_SET2, CPU_SET3, and CPU-SET4 via their respective output terminals Q.

The set-up value transmitting unit 270 receives input of the set-up values CPU_SET1, CPU_SET2, CPU_SET3, and CPU_SET4, stored and output from the D flip-flops 280, 290, 300, and 310 of the second set-up value storage unit 260, and outputs the same to the CPU 200.

After the set-up values are established as in the above, the computer system is reset at step S29 such that the CPU 200 operates to the newly-established set-up values. The set-up values are displayed on the screen during the POST such that the user can check to ensure that they are correct.

In the preferred embodiments of the present invention, a software program is used to establish set-up values for a CPU. As a result, changing the set-up values is easy and the possibility of incorrectly establishing the set-up values is greatly reduced.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may is be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A computer system comprising:
    a bus;
    a central processing unit connected to the bus, for controlling overall operation of the computer system;
    a command input unit connected to the bus, for receiving input of user-selected set-up values;
    a display unit connected to the bus, for providing a visual display of data information including numbers, letters, symbols;
    a chip set generating set-up signals indicating said user-selected set-up values for the central processing unit; and
    a set-up value storage unit for storing the set-up signals indicating the user-selected set-up values from the chip set for enabling the central processing unit to operate in accordance with the user-selected set-up values, said set-up value storage unit comprising four delay flip-flops, each flip-flop having a data terminal for receiving the set-up signals from the chip set, a clock terminal grounded through a first resistor for receiving a write signal from the chip set, a voltage supply terminal connected to a battery voltage, a clear terminal connected to the battery voltage via a second resistor and grounded through a capacitor, and each of output terminals of the flip-flops outputting the specific set-up values to the central processing unit for operation.

2. A computer system comprising:
    a bus;
    a central processing unit connected to the bus, for controlling overall operation of the computer system;
    a command input unit connected to the bus, for receiving input of user-selected set-up values;
    a display unit connected to the bus, for providing a visual display of data information including numbers, letters, symbols;
    a chip set generating set-up signals indicating said user-selected set-up values for the central processing unit; and
    a set-up value storage unit for storing the set-up signals indicating the user-selected set-up values from the chip set for enabling the central processing unit to operate in accordance with the user-selected set-up values, said set-up value storage unit comprising:
        a first D flip-flop having a data terminal for receiving a first one of the set-up signals from the chip set, a clock terminal grounded through a first resistor for receiving a write signal from the chip set, a voltage supply terminal connected to a battery voltage source, a clear terminal connected to the battery voltage via a second resistor and grounded through a capacitor, and an output terminal for outputting a first specific set-up value to the central processing unit;
        a second D flip-flop having a data terminal for receiving a second one of the set-up signals from the chip set, a clock terminal grounded through said first resistor for receiving said write signal from the chip set, a voltage supply terminal connected to said battery voltage source, a clear terminal connected to the battery voltage via said second resistor and grounded through said capacitor, and an output terminal for outputting a second specific set-up value to the central processing unit;
        a third D flip-flop having a data terminal for receiving, a third one of the set-up signals from the chip set, a clock terminal grounded through said first resistor for receiving said write signal from the chip set, a voltage supply terminal connected to said battery voltage source, a clear terminal connected to the battery voltage via said second resistor and grounded through said capacitor, and an output terminal for outputting a third specific set-up value to the central processing unit; and
        a fourth D flip-flop having a data terminal for receiving a fourth one of the set-up signals from the chip set, a clock terminal grounded through said first resistor for receiving said write signal from the chip set, a voltage supply terminal connected to said battery voltage source, a clear terminal connected to the battery voltage via said second resistor and grounded through said capacitor, and an output terminal for outputting a last specific set-up value to the central processing unit.

3. A method of establishing set-up values for a computer system, comprising the steps of:
    mounting a central processing unit on a main board of the computer system;
    supplying power to the computer system;
    determining whether installed set-up values are correct for the central processing unit mounted on said main board; programming new set up values by software control when the installed set-up values are incorrect for the central processing unit mounted on said main board; and re-setting the computer system such that the central processing unit operates in accordance with the changed set-up values.

4. A device for automatically varying an operating speed of a central processing unit of a computer system, comprising:

a bus;

a central processing unit connected to the bus, for controlling overall operation of the computer system;

a command input unit connected to the bus, for receiving inputs of selected commands;

a display unit connected to the bus, for providing a visual display of numbers, letters, and symbols;

an environment storage unit comprising a battery backed memory connected to the bus, for storing environment information installed in the computer system, such that data information of operating speeds of the central processing unit is displayed through the display unit for selection by the user under control of the central processing unit, and when a specific operating speed of the central processing unit is selected by the user, the specific operating speed is stored in the environment storage unit and then used by the central processing unit for operation;

a chip set displaying data of set-up values established by said central processing unit;

a second set-up value storage unit receiving input of signals from said chip set to establish set-up values from said chip set; and a set-up value transmitting unit transmitting said set-up values output from said second set-up value storage unit to said central processing unit.

5. The device of claim 4, said second set-up value storage unit comprises four delay flip-flop circuits, each delay flip flop circuit having a data terminal wherein said signals from said chip set are sent, each delay flip flop circuit having an output terminal outputting said set-up values to said set-up value transmitting unit.

6. The device of claim 5, further comprising a computer system set-up program to program new set-up values into said battery backed memory.

7. The device of claim 6, said chip set reads said set-up values programmed into said battery backed memory.

\* \* \* \* \*